Feb. 21, 1956
O. T. LARSON
2,735,883
ELECTRIC FENCE POST
Filed April 14, 1950
2 Sheets-Sheet 1
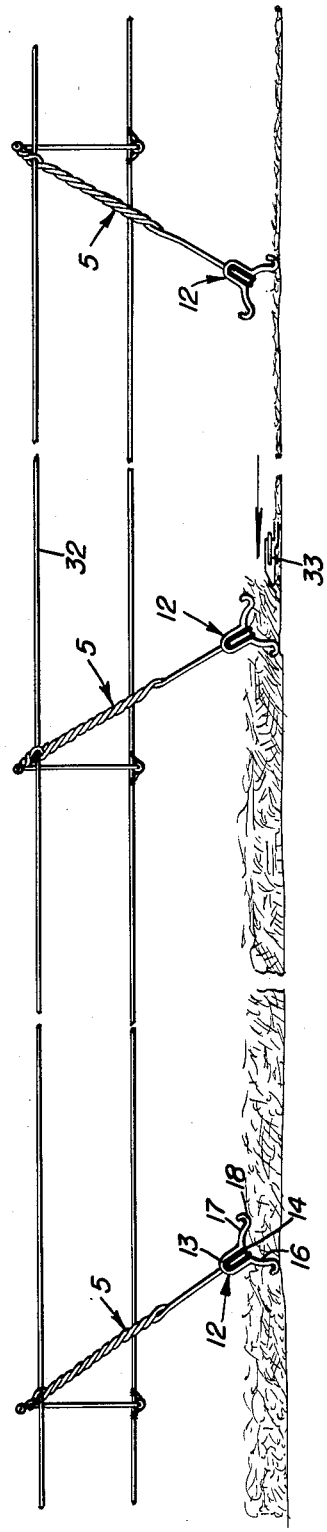
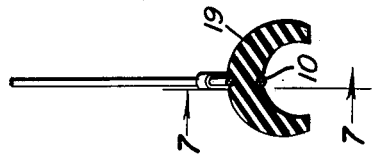
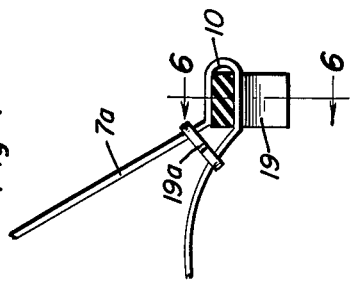
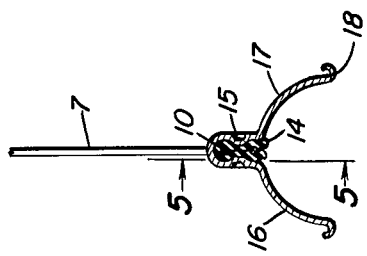
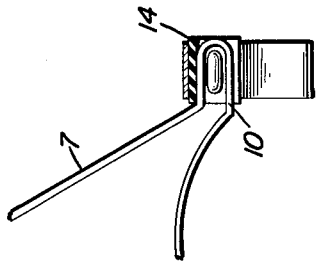
Ole T. Larson
INVENTOR.
BY *Clarence A. O'Brien
and Harvey B. Jacobson*
Attorneys Feb. 21, 1956 — O. T. LARSON — 2,735,883
ELECTRIC FENCE POST
Filed April 14, 1950 — 2 Sheets-Sheet 2
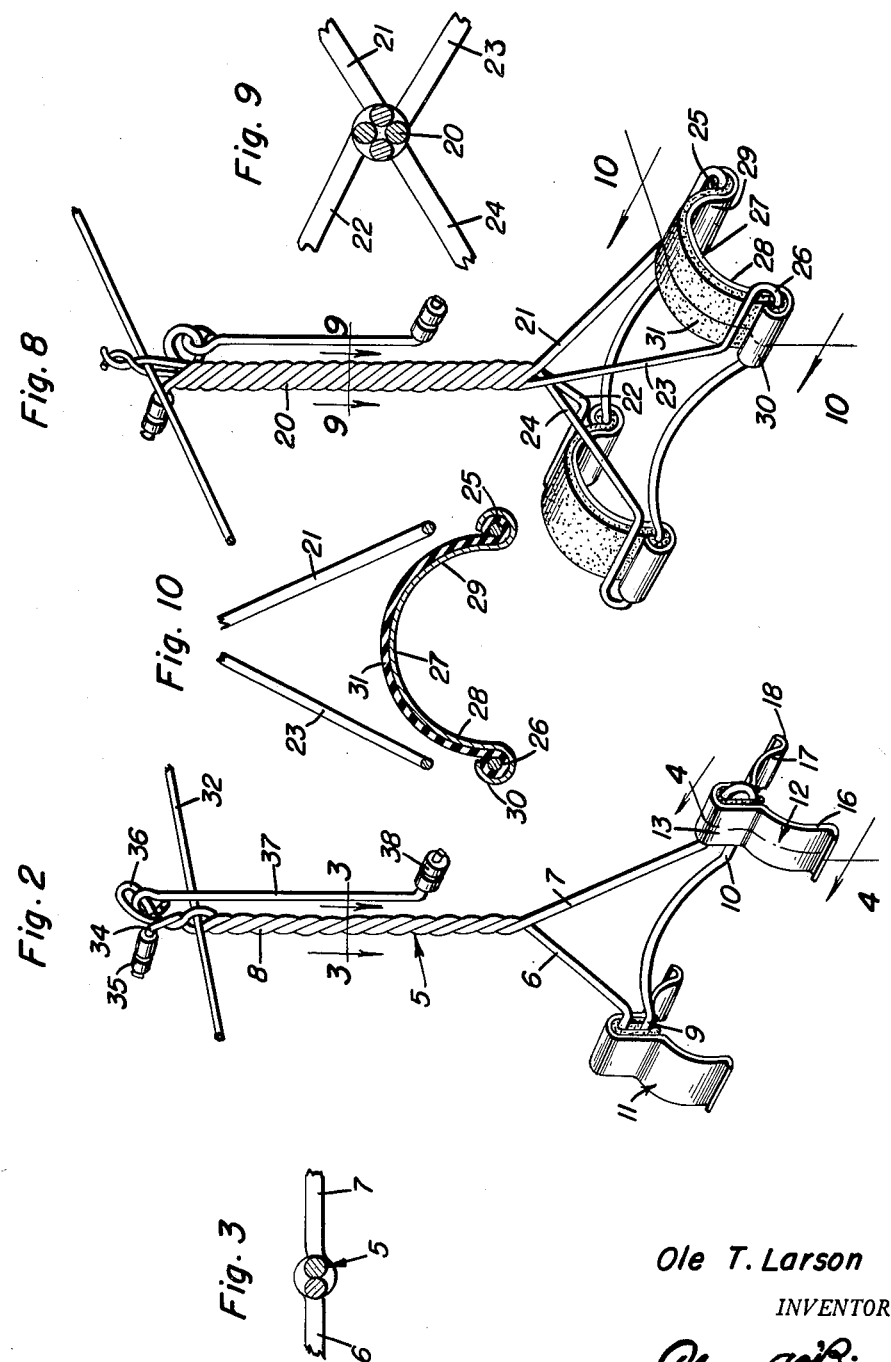
Ole T. Larson
INVENTOR.

United States Patent Office 2,735,883
Patented Feb. 21, 1956

2,735,883

ELECTRIC FENCE POST

Ole T. Larson, Hereford, Tex., assignor of twenty-five per cent to Inman L. Larson Application April 14, 1950, Serial No. 155,858

4 Claims. (Cl. 174—161)

The present invention relates to new and useful improvements in posts for electric fences and more particularly to a post which rests freely on the ground to enable a mower to work under the post to prevent grass and weeds from short circuiting the fence.

An important object of the invention is to provide a fence post for electric fences and providing a pair of legs at the base of the post on which the post is rockable into oppositely tilted positions to hold one of the legs in a raised position for the movement of a sickle bar of a mower thereunder to cut grass and weeds under the post.

A still further object is to provide a fence post for electric fences and in which the post is electrically charged and insulated from the ground to prevent animals from moving the post when coming into contact therewith.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of an electric fence and showing the inclined post;

Figure 2 is an enlarged perspective view of one of the posts;

Figure 3 is an enlarged sectional view taken on the line 3—3 of Figure 2;

Figure 4 is a vertical sectional view of the legs at the base of the post, taken on the line 4—4 of Figure 2;

Figure 5 is a transverse sectional view of the legs taken on the line 5—5 of Figure 4;

Figure 6 is a vertical sectional view of a modified insulated leg construction;

Figure 7 is a transverse sectional view taken on the line 7—7 of Figure 6;

Figure 8 is a perspective view of a modified fence post construction;

Figure 9 is a transverse sectional view taken on the line 9—9 of Figure 8; and

Figure 10 is a vertical sectional view of the legs taken on the line 10—10 of Figure 8.

Referring now to the drawings in detail, and first with respect to the form of the invention illustrated in Figures 1 to 5, inclusive, the numeral 5 designates the fence post generally which is constructed of double wire strands 6 and 7 twisted together to form the upper portion 8 of the fence post, the strands 6 and 7 diverging below the twisted portion 8 and united with each other and shaped to form oppositely extending horizontal U-shaped arms 9 and 10.

Inverted U-shaped bases 11 and 12 are connected in inverted position to the arms 9 and 10, each base being constructed to provide a channeled top 13 in which one of the horizontal arms is positioned and insulated therefrom by a lining 14 of rubber or other suitable insulation material positioned in the channeled top 13. The opposite sides of the channeled top 13 are pressed inwardly as shown at 15 to grip the wire arm and to connect the base rigidly thereto.

The inverted U-shaped base forms a pair of legs 16 and 17 and the lower end of each leg is rolled outwardly as shown at 18 to facilitate rocking on the ground to tilt the post in opposite directions.

In the form of the invention illustrated in Figures 6 and 7, the base for the fence post is designated at 19 and is constructed of inverted U-shaped rubber material, such as a section cut from an automobile tire casing and clamped between the upper and lower portions of the U-shaped horizontal arms at the lower ends of the posts by a clip 19a engaging the wire legs 7a of the post.

In Figures 8, 9 and 10, I have illustrated a modified fence post construction in which the upper portion 20 of the post is formed of four twisted strands of wire indicated at 21, 22, 23 and 24, the lower ends of strands 21 and 22 being united with each other and the lower ends of strands 23 and 24 being similarly united and formed with oppositely extending horizontal U-shaped arms 25 and 26 and with the arms 25 of the pair of strands 21 and 22 and the arms 26 of the pair of strands 23 and 24 positioned in spaced parallel relation with respect to each other.

The inverted U-shaped base members are shown at 27 and are rolled at the lower ends of their legs 28 and 29 to form sleeves 30 in which the lower portions of arms 25 and 26 are gripped with a lining 31 of rubber or other insulation material between the arms and the sleeve 30.

The electrically charged fence wire 32 is loosely held in the twisted strands of the post adjacent the upper end of the post with sufficient freedom to permit the post to rock on base 12 or 27 into opposite tilted positions, as shown in Figure 1.

The posts are tilted uniformly in one direction to raise the same leg of each base sufficiently for the cutter bar 33 of a mower to pass thereunder and upon striking the other leg of the base of the lower end of the post will be carried by the cutter bar to an oppositely fitted position to permit passage of the cutter bar completely under the base and the post then again rests on the ground on one leg. The grass and weeds growing close to the post may thus be cut to prevent short-circuiting of the electric fence.

The insulated base prevents short-circuiting of the fence, while enabling the post to be electrified to prevent animals from moving the posts.

One of the strands of the post is bent horizontally at its upper end, as shown at 34, and on which an insulator 35 is mounted for attaching a fence wire thereto and another strand of the post is formed at its upper end with a loop 36 from which a hanger rod 37 is rockably suspended and on the lower end of which an insulator 38 is mounted for attaching another fence wire thereto.

Having described the invention, what is claimed as new is:

1. In a fence assembly, a fence post comprising a rigid, elongated body, said body including an upper pivot portion, a substantially horizontally disposed current conducting wire runner pivotally attached to the upper pivot portion of said post body permitting said post to pivot through a substantially vertical arcuate plane in generally parallel alignment with the longitudinal axis of said wire runner, a pair of oppositely disposed horizontally extending support arms on a lower end portion of said post body, said support arms extending normal to the longitudinal axis of said post body, a pair of oppositely disposed U-shaped base members secured in downwardly opening relationship from end portions of said support arms, each of said base members including a pair of aligned oppositely disposed leg portions extending substantially normal from said support arms in a plane substantially parallel to the longitudinal axis of said post body, said post body being disposed in an angular relationship relative to the longitudinal axis of the wire runner with one of the legs of each of the U-shaped bases engaged with the ground, the other legs of said bases extending upwardly toward the wire runner, said post body being pivotally movable through the vertical arcuate plane to a substantially oppositely disposed angular position relative to the longitudinal axis of said wire runner with the other legs of said bases in engagement with the ground.

2. In a fence assembly, as set forth in claim 1, including electrical current insulating means interposed between said end portions of the support arms and U-shaped bases for preventing grounding of current through said bases.

3. In a fence assembly, as set forth in claim 1, wherein said post body supports a plurality of horizontally disposed current conducting wire runners.

4. In a fence assembly, as set forth in claim 1, wherein the legs of said bases each include a lower rounded end portion for facilitating pivotal movement of said post about the pivotal connection with the wire runner.

References Cited in the file of this patent

UNITED STATES PATENTS

| | | |
|---|---|---|
| 208,860 | Snyder | Oct. 8, 1878 |
| 359,940 | Patee et al. | Mar. 22, 1887 |
| 499,462 | Johnston | June 13, 1893 |
| 732,231 | Starling | June 30, 1903 |
| 768,077 | Reynolds et al. | Aug. 23, 1904 |
| 800,265 | Carpenter | Sept. 26, 1905 |
| 1,483,005 | McNair | Feb. 5, 1924 |
| 2,264,493 | Werning | Dec. 2, 1941 |
| 2,269,996 | Webster | Jan. 13, 1942 |
| 2,396,512 | Johnson | Mar. 12, 1946 |
| 2,450,730 | Hord | Oct. 5, 1948 |
| 2,502,882 | Perkins | Apr. 4, 1950 |
| 2,574,052 | Metcalf | Nov. 6, 1951 |

FOREIGN PATENTS

| | | |
|---|---|---|
| 46,471 | Denmark | Nov. 14, 1932 |
| 64,671 | Denmark | Aug. 5, 1946 |